United States Patent [19]
Rogers

[11] Patent Number: 5,436,543
[45] Date of Patent: Jul. 25, 1995

[54] DEVICE FOR DUPLICATING IRREGULAR SHAPES

[76] Inventor: William D. Rogers, 363 Hill St., Southampton, N.Y. 11968

[21] Appl. No.: 174,449

[22] Filed: Dec. 28, 1993

[51] Int. Cl.⁶ ............................................. G05B 19/25
[52] U.S. Cl. .................................. 318/570; 318/560; 318/576; 318/577
[58] Field of Search ............. 318/570, 560, 576, 577, 318/567, 568.1; 364/474.29

[56] References Cited

U.S. PATENT DOCUMENTS

| | | | |
|---|---|---|---|
| 3,696,226 | 10/1972 | Sablotny | 318/576 |
| 3,786,331 | 11/1974 | Sommeria et al. | 318/570 |
| 5,055,752 | 10/1991 | Leistensnider et al. | 318/570 |
| 5,247,233 | 9/1993 | Matsuura et al. | 318/570 |

Primary Examiner—William M. Shoop, Jr.
Assistant Examiner—Karen Masih
Attorney, Agent, or Firm—Parkhurst, Wendel & Rossi

[57] ABSTRACT

There is disclosed a device for the duplication of irregular shapes that must be reproduced on a surface but cannot be traced directly on the surface. The device includes a stylus, a length of chain or the like attached to the stylus, and a duplicator attached to the other end of the chain. The duplicator contains a programmable memory, such as a RAM chip, and servo-type motor to vary the length of the chain as the program is run.

7 Claims, 2 Drawing Sheets

DEVICE FOR DUPLICATING IRREGULAR SHAPES

BACKGROUND OF THE INVENTION

The present invention is directed to a device for duplicating irregular shapes.

Many types of craftsmen have the need to reproduce irregular shapes; having to produce irregular shapes presents an enormous problem for those craftsmen.

1. Field of the Invention

The present invention is directed to a device for easily reproducing irregular shapes.

Irregular patterns must be produced and reproduced for drywall (which has to be cut to fit), linoleum, carpet, and bulkheads in boats. The device of the present invention allows irregular shapes to be easily reproduced for each of the designated areas and other areas where irregular shapes must be reproduced.

2. Discussion of the Prior Art

Various devices are known for repeating patterns in garment manufacture; for example, see U.S. Pat. No. 3,895,358 to David R. Pearl. It was unknown, however, prior to applicant's invention to provide a device for the duplication and reproduction of irregular shapes in and on items such as dry wall and boat bulkheads.

SUMMARY OF THE INVENTION

The present invention is directed to a duplication system device having a measuring means for reproducing irregular shapes.

The means for measurement include twine, rope, chain, flexible metal (as in tape measures), and beaded pull chain (often found with light fixtures).

The duplication system device also contains a duplicator having a programmable memory which allows the measurement means, e.g., flexible chain material, to proceed in accordance with a predetermined pattern. The programmable memory can be provided, for example, with a random access memory (RAM) chip.

The duplication system device of the present invention also can be provided with an anchoring means including a suction device, a circle for placement on a screw, nail, or hook temporarily present in the product on which the irregular shape is to be duplicated or the like.

BRIEF DESCRIPTION OF THE DRAWINGS

The invention may be better understood by reference to the drawings wherein.

DETAILED DESCRIPTION OF THE PREFERRED EMBODIMENTS

Figure 1:
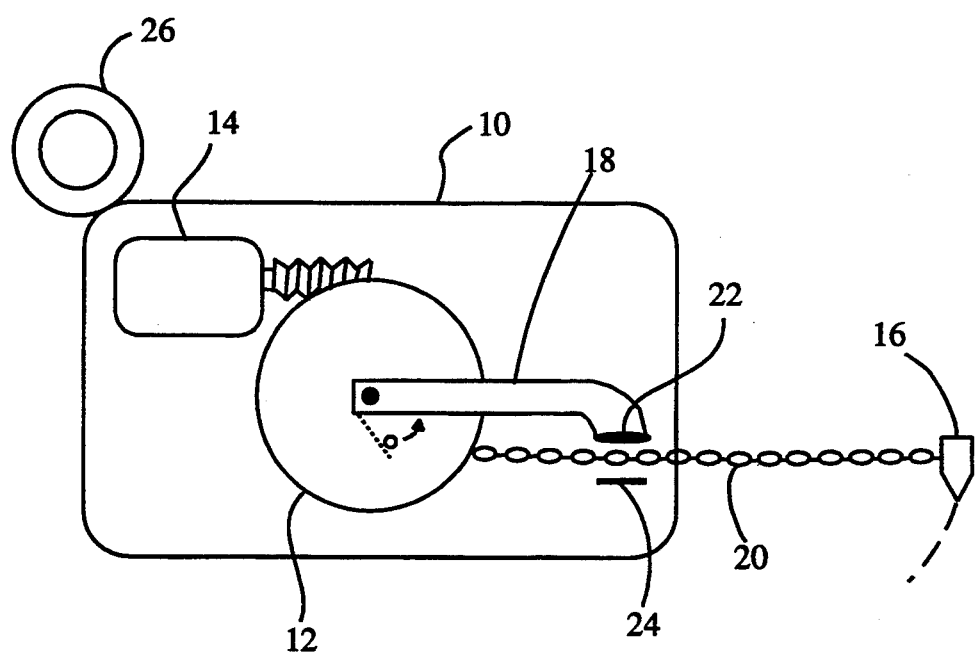
FIG. 1 shows a device of the present invention having a stylus and chain.

The duplication system device of the present invention can be understood by referring to FIG. 1 wherein the device is generally depicted as 10.

Within the device is a length-measuring drum 12 controlled by a small servomotor 14 which reproduces the storage shape as a stylus 16 is drawn across the new surface.

More particularly, the distance from the center of the duplicator to the tracing stylus is recorded in the RAM chip in the duplicator as a function of the angle described by the chain with reference to the duplicator as it is held stationary.

The duplicator arm 18 swivels as the chain 20 and the stylus 16 trace the shape. The angle being scribed with respect to the statutory duplicator is recorded as a function of the length of the chain at that time. The servomotor 14 is disengaged while the information is being recorded in the RAM chip. The measuring device functions as an inclinometer and permits reproduction of the movement of the stylus 16.

The duplicator drum 12 contains a spring-loaded take-up reel to hold the chain.

As the chain is fed out and passes a photocell 22, the number of beads on the chain is recorded by a light-emitting diode (LED) 24.

When one wishes to reproduce a shape, one uses the chain length v. angle information stored in the RAM chip. That information is used to activate the servomotor so that the stylus reproduces the stored shape.

The device can be used to reproduce any two dimensional shape smaller than the length of the chain. The device normally will have a measuring range of 8 feet or more since the device frequently will be used to scribe standard sheets of building material, which have dimensions of four feet by eight feet.

The device can contain an anchoring means such as a circular holder 26 which can be hung on a hook or a nail.

All electronics are readily available basic components—a couple of RAM chips, a dedicated processor, an LED, a photocell, an inclinometer, and a nickel-cadmium (Ni-Cad) battery.

Figure 2:
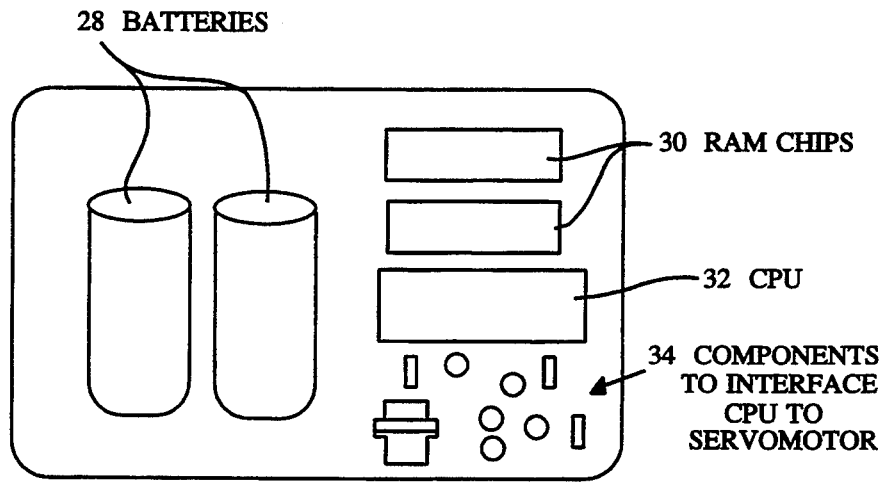
FIG. 2 is an interior view of the device of the present invention showing the electronics arrangements.

FIG. 2 shows a typical arrangement of the electronics of the device of the present invention. The electronics are placed on one side of the device (see the top part of the device shown in FIG. 3) and include Ni-Cad batteries 28, RAM chips 30, central processing unit (CPU) 32, and discrete components 34 such as resistors, silicon controlled rectifiers (SCRs), or other components needed to interface the CPU 32 to the servomotor 14.

Figure 3:
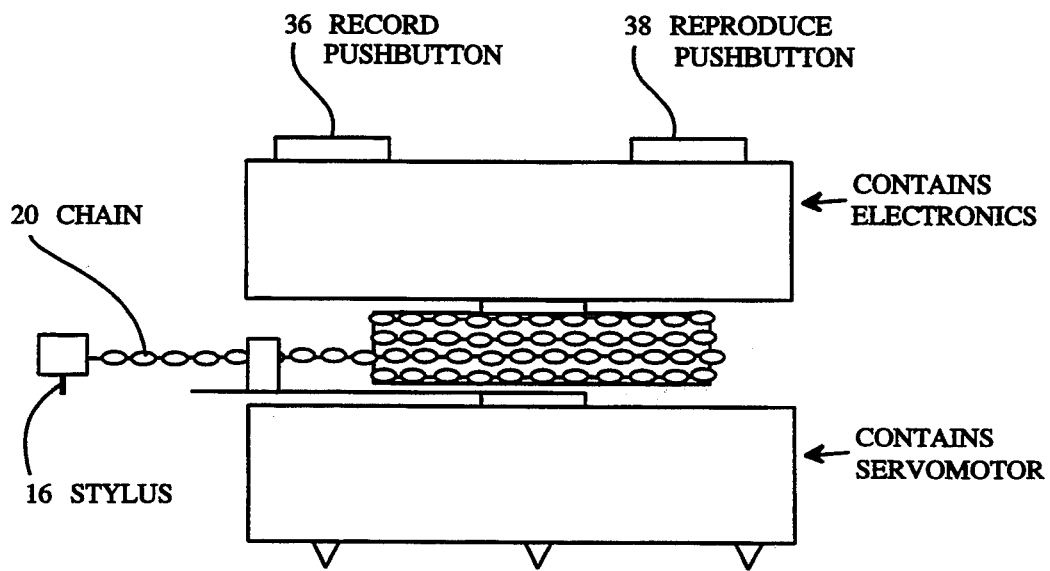
FIG. 3 is a top view of the device of the present invention.

FIG. 3 shows the device with a record pushbutton 36 and reproduce pushbutton 38. Servomotor 14 is located in the bottom part of the device in FIG. 3.

The overall device can be about the size of a standard cigarette pack.

What is claimed is:

1. A device for the duplication of irregular shapes that must be reproduced on a surface but cannot be traced directly on to said surface, said device comprising
   a material having a length that is capable of variation,
   a duplicator attached to one end of the variable length material, said duplicator having a programmable memory that, upon activation, varies the length of the material in accordance with a preset pattern, and
   a stylus attached to the other end of the variable length material.

2. The device of claim 1 wherein the programmable memory in the duplicator is provided by a random access memory chip.

3. The device of claim 1 wherein the duplicator has an anchoring means.

4. The device of claim 1 wherein the variable length material is a piece of chain.

5. The device of claim 1 further including a servomotor.

6. The device of claim 1 further including a light-emitting diode.

7. The device of claim 1 further including a rotatable arm attached to the duplicator.

* * * * *